UNITED STATES PATENT OFFICE.

CARL V. PETRAEUS, OF JOPLIN, MISSOURI, ASSIGNOR TO OLIVER H. PICHER, OF SAME PLACE.

PAINT COMPOUND.

SPECIFICATION forming part of Letters Patent No. 571,128, dated November 10, 1896.

Application filed June 29, 1892. Serial No. 438,417. (No specimens.)

*To all whom it may concern:*

Be it known that I, CARL V. PETRAEUS, of Joplin, county of Jasper, State of Missouri, have invented a certain new and useful Paint Compound, of which the following is a true and exact description.

My invention relates to paint made from what is known as "sublimed lead," that is to say, from the lead fumes formed by burning or smelting lead, which are caught in screens connected with the furnaces. These fumes consist of a mixture of lead sulfate and lead oxid, usually in admixture with more or less zinc oxid. Heretofore the sublimed lead has been ground in oil in the usual way to form paint; but the paint thus formed has a tendency to harden, a phenomenon which does not appear to be due to any chemical change in the oil, since as the hardened compound is stirred and run through a grinding-mill it again softens; but this is a source of trouble and expense to the painters or dealers. The trouble can be to a certain extent overcome by using a larger proportion of oil than that necessary to make a paint of proper consistency; but, while the liability to harden is thus diminished, other defects occur, as the pigment then has a tendency to settle and the oil to become "fatty." Such paint is called by the grinders "sloppy," and in opening kegs containing such sloppy paint leakage occurs through the cracks between the staves, causing loss and dirt.

I have discovered that the hardening of the compound can be prevented without deleterious effect on the paint by using together with sufficient oil to prevent hardening (that is to say, with oil in excess of that necessary to form a normal paint mixture) a quantity of water, the effect of which is to stiffen the paint compound, destroying its sloppy appearance and nature, and obviating the drawbacks noted above as to sloppy paint. Not only does the water stiffen the paint, but its presence is advantageous when spread on a painted surface. The water in it aids with the oxid of lead and oil in the formation of a lead soap, just as in case of the ordinary white lead of commerce the chemically-combined water of the hydrated oxid of lead does, this lead soap, as is well known, increasing the lasting quality of the paint.

The quantity of water will vary as the grinders prefer a thicker or thinner paint. I have found a good paint to be formed by using to one hundred pounds of lead nine pounds of oil and from a half-pound to a pound of water, and for each pound of oil in excess of nine pounds a quarter-pound of water.

The water may be introduced in many ways. Thus the sublimed pigment may be ground in a mixture of the determined proportions of oil and water, or the pigment may be first ground in oil and then the water added and the mixture reground, or the pigment may be ground in water, of which an excess may be used, and the oil afterward added and ground in. After grinding, the excess of water, if any, is expelled.

In addition to the water it is often advantageous to use other ingredients which will affect the character of the resulting paint compound. Thus I have with advantage used water in which is dissolved some alkali, borax, and a little soap, and I have perceived direct advantage from adding with the water a solution of a resinous gum, &c.

Having now described my invention, what I claim as new, and desire to secure by Letters Patent, is—

A paint compound made of sublimed lead, oil in excess of that necessary to form a mixture of proper consistency, and water substantially as and for the purpose specified.

CARL V. PETRAEUS.

Witnesses:
JNO. C. KEENAN,
W. C. PORTER.